United States Patent
Page

(10) Patent No.: US 10,699,678 B2
(45) Date of Patent: Jun. 30, 2020

(54) SYSTEM AND METHOD FOR GENERATING INTERACTIVE LAYERS OVER THE DISPLAY OF A RESOURCE BY ANOTHER APPLICATION

(71) Applicant: John Henry Page, Washington, DC (US)

(72) Inventor: John Henry Page, Washington, DC (US)

( * ) Notice: Subject to any disclaimer, the term of this patent is extended or adjusted under 35 U.S.C. 154(b) by 383 days.

(21) Appl. No.: 15/215,140

(22) Filed: Jul. 20, 2016

(65) Prior Publication Data
US 2017/0024085 A1    Jan. 26, 2017

Related U.S. Application Data

(60) Provisional application No. 62/196,856, filed on Jul. 24, 2015.

(51) Int. Cl.
| | |
|---|---|
| G06F 16/9038 | (2019.01) |
| G09G 5/377 | (2006.01) |
| G06F 3/14 | (2006.01) |
| G06Q 30/00 | (2012.01) |
| G06F 9/451 | (2018.01) |

(52) U.S. Cl.
CPC ............... *G09G 5/377* (2013.01); *G06F 3/14* (2013.01); *G06F 9/451* (2018.02); *G06F 16/9038* (2019.01); *G06Q 30/00* (2013.01); G09G 2320/0693 (2013.01); G09G 2340/12 (2013.01); G09G 2370/022 (2013.01); G09G 2370/027 (2013.01)

(58) Field of Classification Search
CPC .................................. G06F 17/30368
USPC .................................. 707/738, 737
See application file for complete search history.

(56) References Cited

U.S. PATENT DOCUMENTS

| | | |
|---|---|---|
| 5,874,959 A | 2/1999 | Rowe |
| 6,584,479 B2 | 6/2003 | Chang et al. |
| 7,209,928 B2 | 4/2007 | Kenyon |
| 7,860,852 B2 * | 12/2010 | Brunner ............... G06F 16/951 707/706 |
| 8,122,014 B2 | 2/2012 | Brindley et al. |
| 8,640,037 B2 * | 1/2014 | Goodwin ............. G06F 3/0484 715/760 |
| 8,743,145 B1 * | 6/2014 | Price .................... G06T 19/006 345/633 |
| 2003/0187968 A1 | 10/2003 | McKnight |
| 2006/0143558 A1 * | 6/2006 | Albornoz ............. G06F 40/197 715/205 |
| 2012/0054440 A1 * | 3/2012 | Doig ................... G06F 16/9574 711/122 |

OTHER PUBLICATIONS

U.S. Appl. No. 52/711,097, filed Dec. 14, 1993, Barker et al., p. 4, col. 4, Line 10.

* cited by examiner

*Primary Examiner* — Sheree N Brown

(57) ABSTRACT

Methods, apparatus and logic allowing one or more users to apply user layer configuration data containing rules for executing one or more comparison tests to retrieved information and displaying the results in a graphical overlay without modifying the underlying retrieved information.

20 Claims, 14 Drawing Sheets

©2014, 2015 John H. Page

SYSTEM AND METHOD FOR GENERATING INTERACTIVE LAYERS OVER THE DISPLAY OF A RESOURCE BY ANOTHER APPLICATION

CROSS-REFERENCE TO RELATED PATENT APPLICATION

This application claims the benefit of priority to U.S. Provisional Application No. 62/196,856, filed on Jul. 24, 2015, the disclosure of which is incorporated herein in its entirety by reference.

FIELD OF THE INVENTION

The invention relates generally to graphical user interfaces enabling users to automate processing of and action on information resources generated by underlying software applications and graphically show the results in a user display layer.

BACKGROUND OF THE INVENTION

Users employ software applications to search for, view and modify information resources. These individual software applications have varying capabilities for automating user actions to finding, filtering, analyzing and updating the information resources.

Without automated support for processing results displayed by the underlying software application, achieving desired objectives can be very time consuming and mentally taxing for users, for example requiring them to copy reference identifiers, mentally memorize and compare displayed results to satisfy a set of conditions they hold in their mind. Automated support for such operations will enable users to be much more efficient and effective. Demand for such automation is significant and will only increase with the continued expansion of information resources available on the Internet. Users need tools that enable them to make wider comparisons of displayed results in less time, for example, by eliminating duplicate results and automating aspects of item comparison through interactive overlays they can easily customize.

Furthermore, the advent of devices with smaller screen sizes and mobile devices make it more difficult and time consuming for the user to achieve the same results than with a large screen. These disadvantages can be offset through the same layered automation approach as outlined above.

BRIEF SUMMARY OF THE INVENTION

According to an embodiment of the present invention, a user may invoke user layer software to process information retrieved by another application using sets of user layer configuration data from to generate display overlays. The preferred embodiment will record and show the relationship between the contents of the display overlay and the retrieved information to which it relates. Each set of user layer configuration data may have a different purpose or multiple purposes can be embodied in a single layer; for example one user layer may highlight duplicate display items, one may look for price parameters and another may hold and show information about the user's prior comparisons. The graphical overlay itself can be presented on top of the underlying display rendered by retrieval and display software, or may be separately displayable, with user control over which user layers are active.

In a preferred embodiment each user layer's behavior may be configured using parameters supplied by the user, which set of user layer configuration data may comprise one or more of keywords, strings of words or phrases, logic sequences, language expressions, paradigms, object recognition and target outcomes.

In a preferred embodiment, the system and its user layers may be configured to take actions automatically, as if carried out by the user; for example following promising links on a web site. For example, if the underlying retrieval and display software application is a web browser the user layer might be configured by the user to examine all items on a web page, search for those items at a better price and display them in a graphical overlay to that web page.

In the preferred embodiment, the system and its user layers may retain information about resources previously retrieved and use that information, along with the user layer configuration data supplied by a user as part of a user layer, to generate a graphical overlay. For example, if the user is searching the Internet using retrieval and display software but wishes to know which items were already returned by their prior searches, the user layer would detect this condition and the graphical overlay could, for example, contain highlights to assist the user in distinguishing new results from prior duplicates and links that take the user to the source of those results.

The system may further facilitate resource exploration through a user layer that examines resources additional to those currently displayed on the user's display. In this embodiment, the system uses criteria drawn from one or more user layers to retrieve additional information which can then be processed according the user layer's criteria, for example to identify duplicate results across a range of domains which can then be subject to more detailed examination.

The system may further facilitate resource exploration through a range of comparison options defined by the user in a set of user layer configuration data. For example, a user layer may be configured by a user with a list of reference resource identifiers that, when a user searches directly on any web site those reference sites are examined for conflicting information. As a further example, comparison options may include including matching logic, tests for similarity or differences between items and artificial intelligence operations to identify useful information for display in a graphical overlay.

The system may further speed up user tasks through a user layer that summarizes content within one or more resources. For example, some web sites have very large web pages or extensive web site sections that take a human user significant time to extract the details they are looking for. A user layer may help a user zoom in on salient details more quickly and accurately by presenting a graphical overlay summarizing results by showing snippets of resources, say, that mention a particular town or contain an image of a particular statue which snippets may embed hyperlinks that take the user to the area of the web page from which it was taken.

The system may further assist the user to organize the knowledge that is shown to them in a user layer by allowing content to be annotated in text or any multimedia format within a graphical overlay.

The system may further assist the user to perform complex operations by allowing them to define user layers that operate on the output of other user layers. This embodiment allows the user to specify whether the user layers operate in series like successive filters or operate in parallel with a single combined result. In other words, a user layer and its results both may constitute displayable resources. Such interconnection between different user layers allows users to quickly create a custom tool from previously configured items that alerts them to complex conditions that include referring to multiple information sources. For example, by combining the results of a user layer that de-duplicates exact items with the results of a user layer that explores other resources for items that match a user selected image from the software application's output, the user may configure for themselves a combined user layer that produces a graphical overlay alerting them to similar but unique alternatives.

The system may further assist users by allowing them to hide the overlay by means of a toggle mechanism.

The system may further assist users by allowing them, using one or more user layers, to set notifications which will alert them when certain conditions or results occur. For example, the user may wish to be alerted if the web page they are reading contains a date or series of dates.

The system may further assist the user's reviewing of results from user layer operations through a history of each layer's operation, the user layer configuration data applied and the graphical overlay produced.

The system may further assist users through the ability to search user layers, the results of user layer operations and the histories of same.

The system may further assist the user to organize the storage of results by entering topic and category information and making those labels available in retrieval operations.

The system may further assist users through the ability to share user layers and their user layer configuration data between them. Thus, an investment by one user in configuring a user layer may be transferred to another, perhaps for use with a different set of application software resources.

The system may further assist users through the ability to share the output of user layers with other users.

According to another embodiment of the invention, the user may direct the user layer software to constrain its operations to the items currently displayed to the user or to constrain its operations to an area snipped from the items currently displayed to the user. This method has applicability where, say, a web page is only partially visible or the user is wants the user layer software to operate on a single product within the currently displayed web page.

Additional embodiments include deriving and displaying at least one distinguishing mark, style or mode which are used to denote different types of user layer result. For example an X might be used to indicate a duplicate, a greyed out image might indicate an item not found on other sites. This additional information may be displayed through alpha-numeric characters or graphical techniques configured for use with the relevant user layer.

The system may further assist users through the ability to segregate user layers and their configuration data results into separate user episodes. For example, if a user was researching groceries yesterday and consumer electronics today and wishes to re-use the same user layers and their configuration data, a preferred embodiment will permit them to carry out these episodes separately with concurrent segregation.

According to another embodiment of the invention, an apparatus for employing user layer software includes a display, an input/output hardware unit and a program memory coupled to a processor. The input/output hardware unit is capable of exchanging data with a network and data associated with electronic resources accessible over the network. The program memory stores program instructions and the a processor executes program instructions to (i) produce output from one or more software applications, (ii) execute the user layer software for any user layer configuration data that has been enabled for those software applications, and (iii) display a graphical overlay derived from the output of the user layer software over the output from the software applications in accordance with the user layer configuration data.

According to another embodiment of the invention, a system for employing user layer software includes a database, an input/output hardware unit, and a program memory coupled to a processor. The input/output hardware unit is capable of exchanging data with a network. The program memory stores program instructions and the a processor is capable of executing the program instructions to: (i) store and retrieve from the database user layer configuration data (ii) store and retrieve from the database configuration the results from the user layer software having been executed using user layer configuration data iii) initiate the exchange with other users of user layer configuration data, iv) initiate the exchange with another user of the results from the user layer software having been executed using user layer configuration data.

According to another embodiment of the invention, a computer program product includes computer program logic stored in a tangible medium, wherein the computer program logic executes program instructions to (i) execute the user layer software for any user layer configuration data that has been enabled for a software application, and (iii) display a graphical overlay derived from the output of user layer software over the output from the software applications in accordance with user layer configuration data.

According to another embodiment of the invention, a computer program product includes computer program logic stored in a tangible medium, wherein the computer program logic includes logic for causing a computer program to: (i) store and retrieve from the database user layer configuration data (ii) store and retrieve from the database configuration the results from the user layer software having been executed using user layer configuration data iii) initiate the exchange with other users of user layer configuration data, iv) initiate the exchange with another user of the results from the user layer software having been executed using user layer configuration data.

BRIEF DESCRIPTION OF THE SEVERAL VIEWS OF THE DRAWING

The foregoing features and advantages are illustrative only and will be more fully appreciated in view of the appended figures described below.

DETAILED DESCRIPTION OF THE INVENTION

Figure 1:
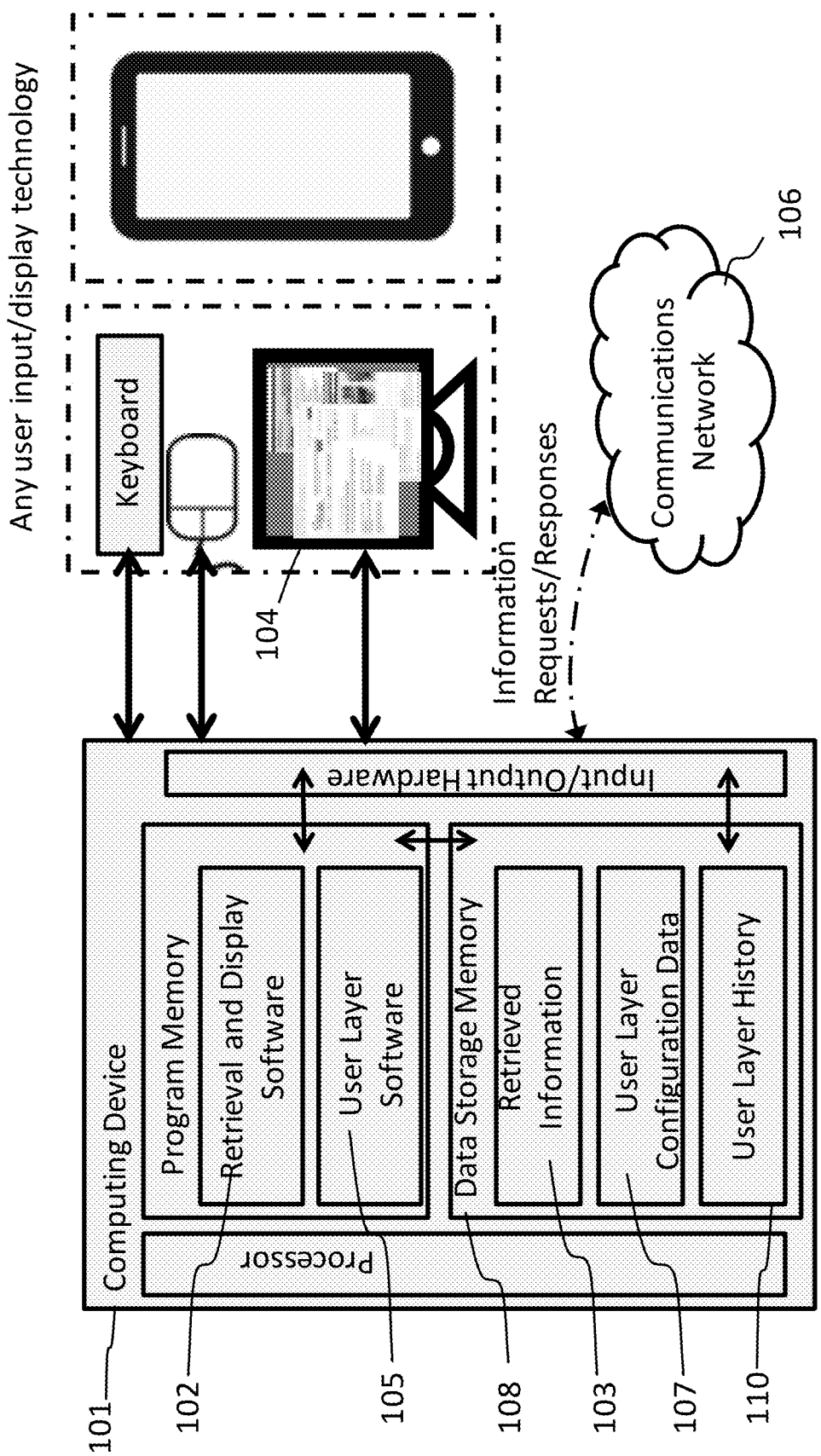
FIG. 1 shows user layer software installed on a user's computing device connected to a user display and a communications network according to an embodiment of the invention.

According to an embodiment of the present invention and as illustrated at FIG. 1, a user using a computing device 101 comprises a processor, program memory and data storage memory together with input/output hardware that connects the computing device to peripheral devices and a communications network 106. Peripheral devices to the computing device may comprise one or more of a user display 104, keyboard, pointing mechanism and other peripherals may include voice input, gesture recognition and motion detection devices. The user operates retrieval and display software 102 loaded onto the computing device 101 that initiates information requests and receives responses over a communications network 106 to display retrieved information 103 on the a user display 104. Under this embodiment, the user loads user layer software 105 to process retrieved information 108 according to the specifications contained in one or more sets of user layer configuration data 107 to generate one or more user layer displays 302.

Figure 2:
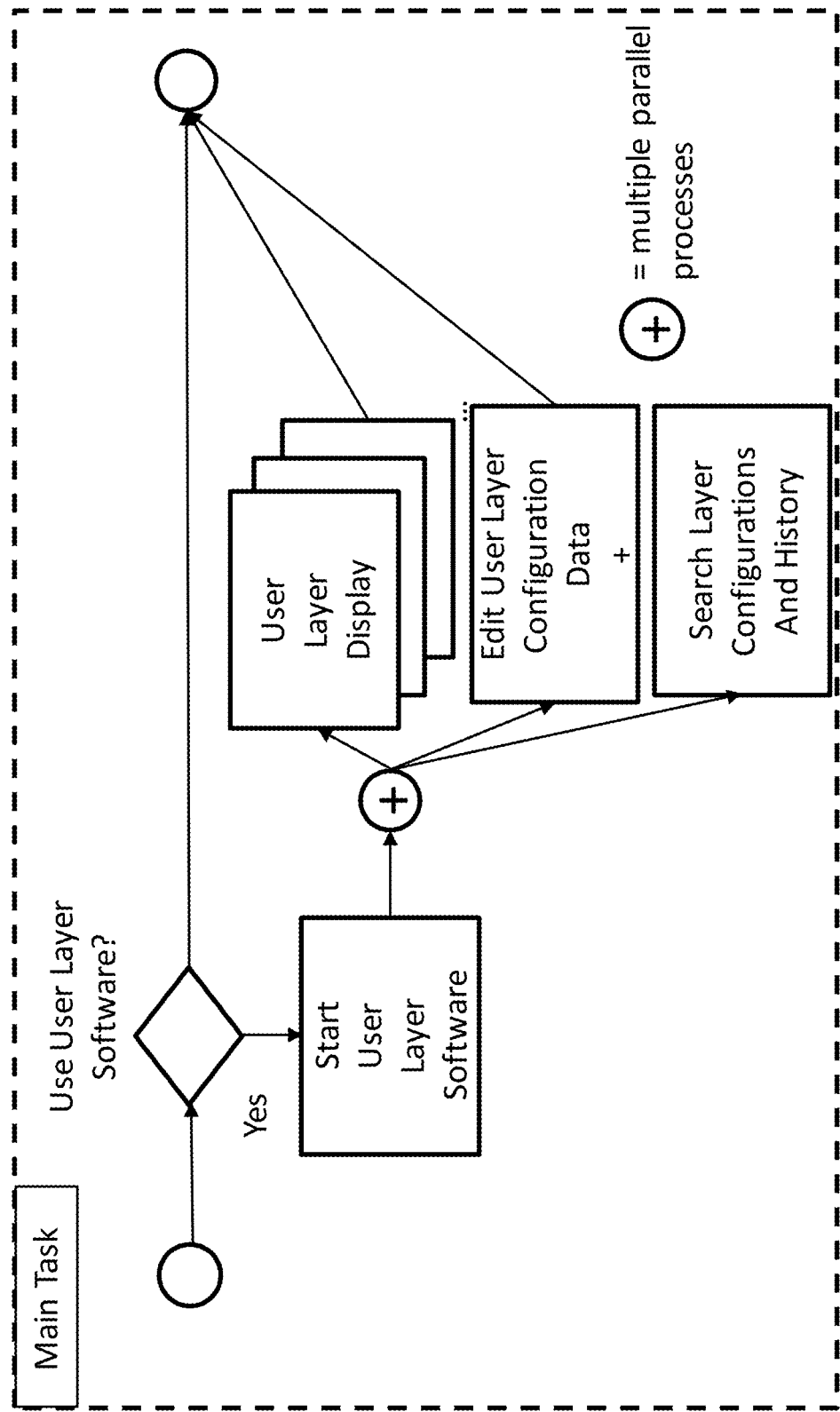
FIG. 2 is a high level view process flow of user layer software's operation from a user's perspective showing that after selecting to use user layer software they may edit user layer configuration data to produce user layer displays and search said layer configuration data and the history produced by its operation, according to an embodiment of the invention.

In a preferred embodiment, a user may control the behavior of the user layer software 105 through a main task interface for which a control flow chart is illustrated at FIG. 2. A user may decide whether or not to use user layer software 105 and if they do they may create and edit one or more sets of user layer configuration data 107 and control which of said sets of user layer configuration data are active for the generation of user layer displays 302.

Figure 7:
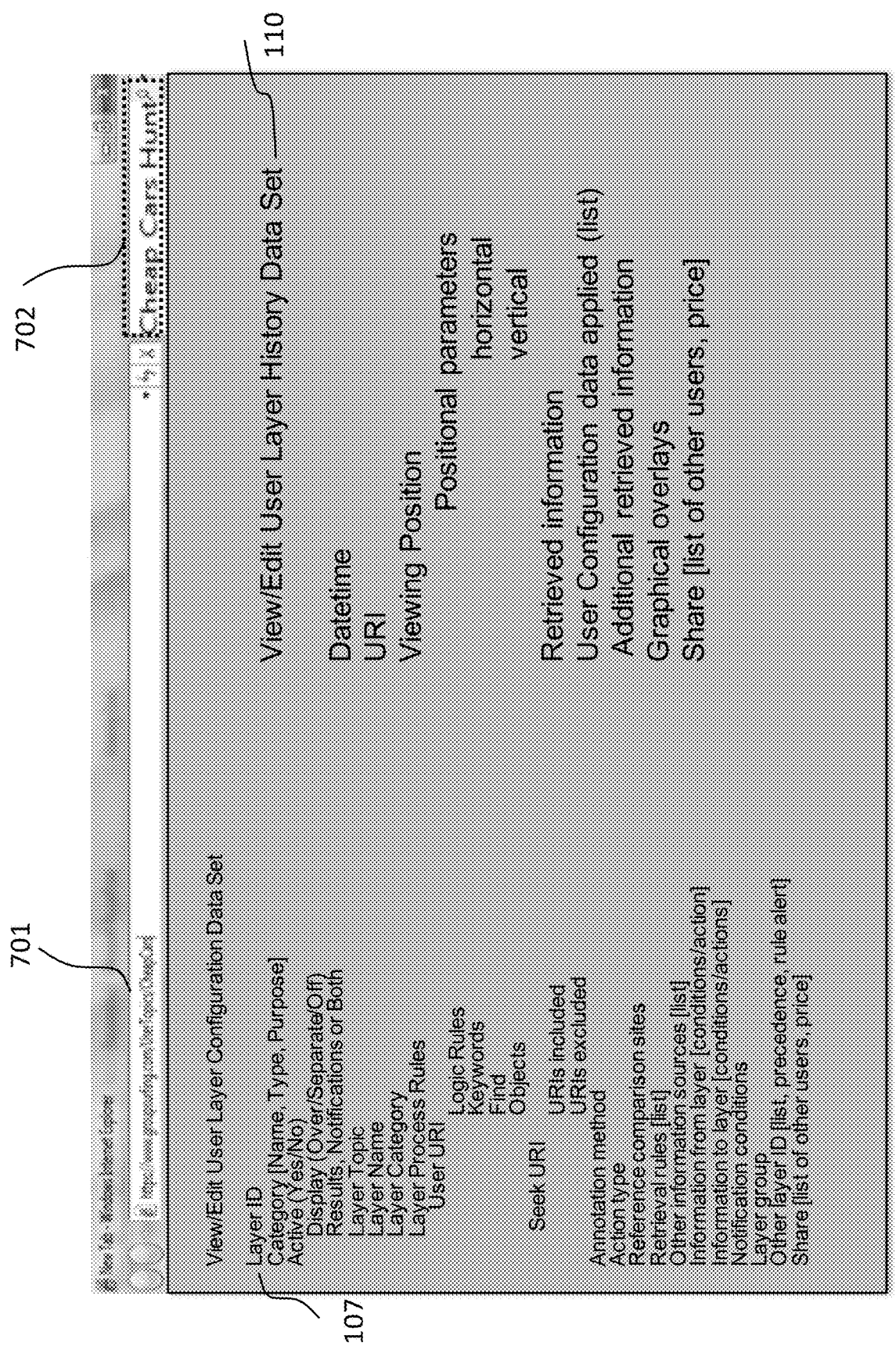
FIG. 7 illustrates user layer software being used to search and edit user layer configuration data and user layer history data, according to an embodiment of the invention.

In a preferred embodiment, each user layer's behavior, resulting from the application of user layer configuration data 107 to retrieved information 108 by user layer software 105, is configurable using parameters and instructions supplied by a user 501 that may comprise comparison tests against one or more of keywords, strings of words or phrases, logic sequences, language expressions, paradigms, object recognition and target outcomes as further illustrated at FIG. 7.

Figure 3:
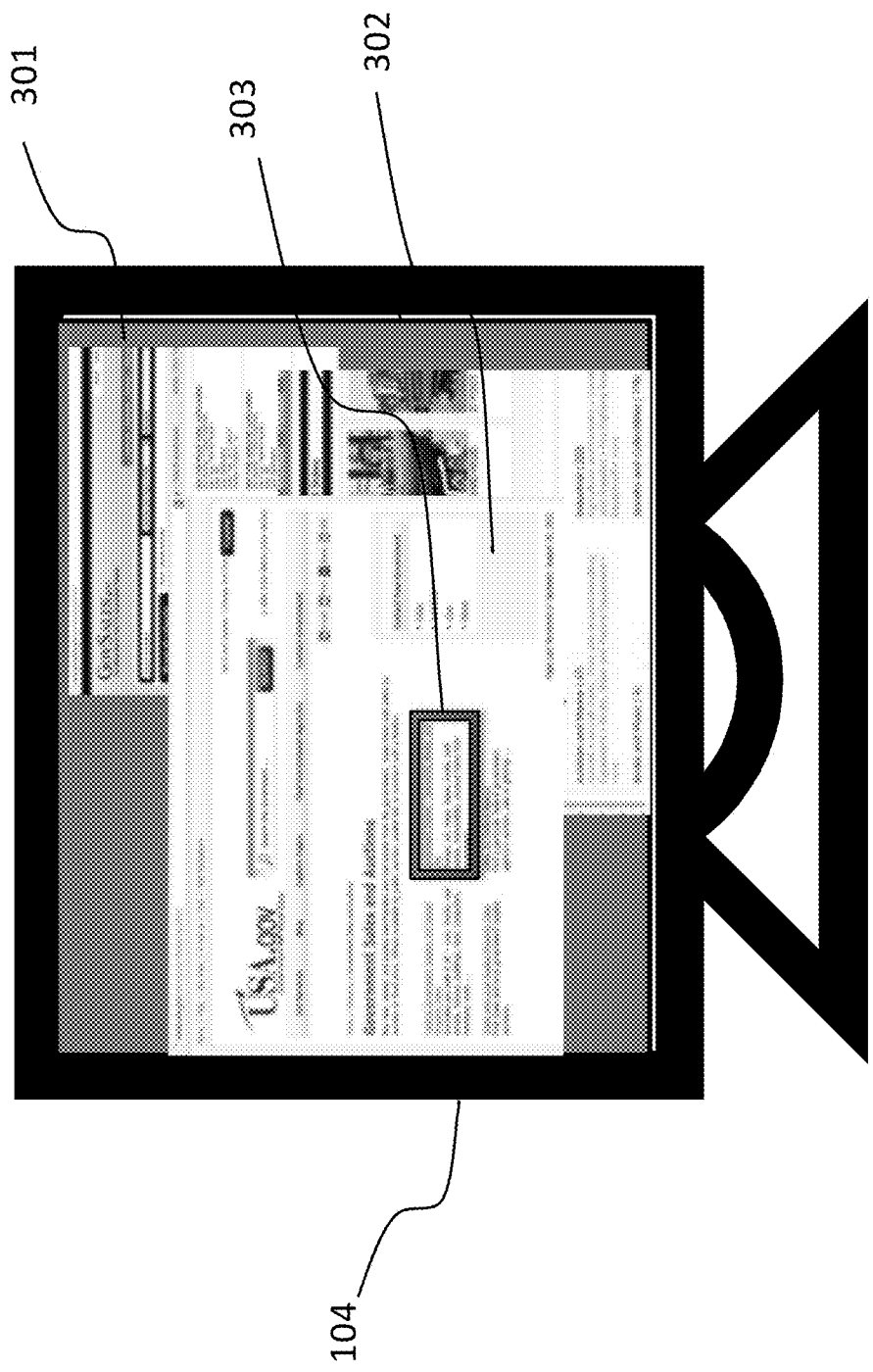
FIG. 3 shows the relationship between a user display and one or more display windows containing output from retrieval and display software and a user layer display produced by user layer software comprising one or more annotations of that output, according to an embodiment of the invention.

In the preferred embodiment user layer software 105 processes one or more sets of user layer configuration data 107 to compute one or more graphical overlays 303 for display in context with associated retrieved information 108 as rendered by retrieval and display software 102 on a user display 104 within a user display window 301 and this is illustrated in FIG. 3.

In another embodiment a graphical overlay 303 may be separately displayable, even to the extent of being shown in a separate user display window 301 than retrieved information 108. In combination, whether shown in the same window or not, rendered retrieved information 108 plus one or more graphical overlays 303 form a user layer display 302.

Figure 4:
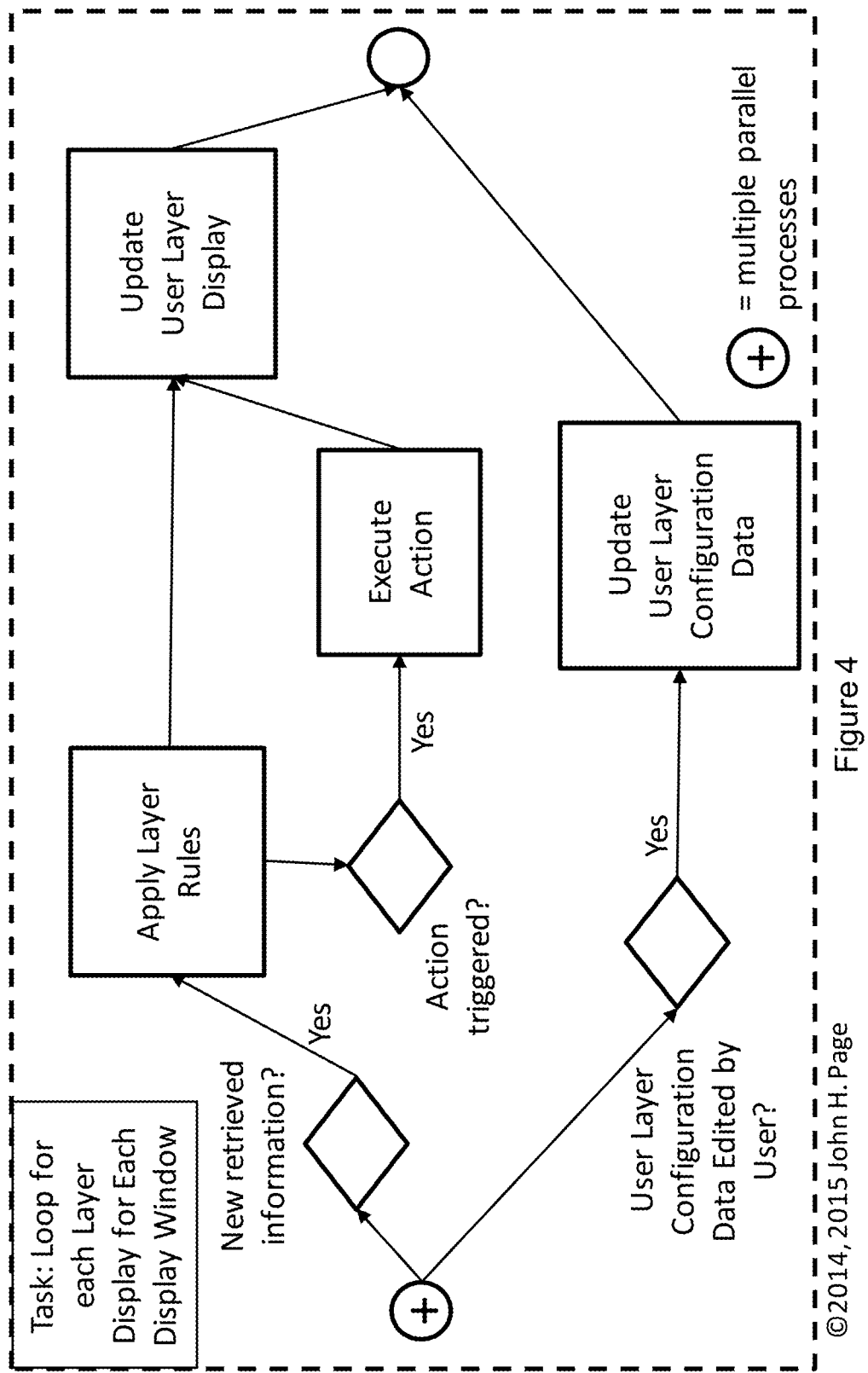
FIG. 4 illustrates a process flow of user layer software for one or more sets of user layer configuration data, which sets are applied to one or more display windows, according to an embodiment of the invention.

A preferred embodiment is illustrated in FIG. 4 which is a flow diagram of core functions performed by the user layer software 105 on an active set of user layer configuration data 107. Where user layer configuration data 107 contains parameters and instructions that require data in addition to retrieved information 103 the user layer software 105 executes actions to access that additional data which may reside in a user layer history 110 or, as in FIG. 5, on a storage device 503 attached to a resource server accessed via a communications network 106.

Figure 5:
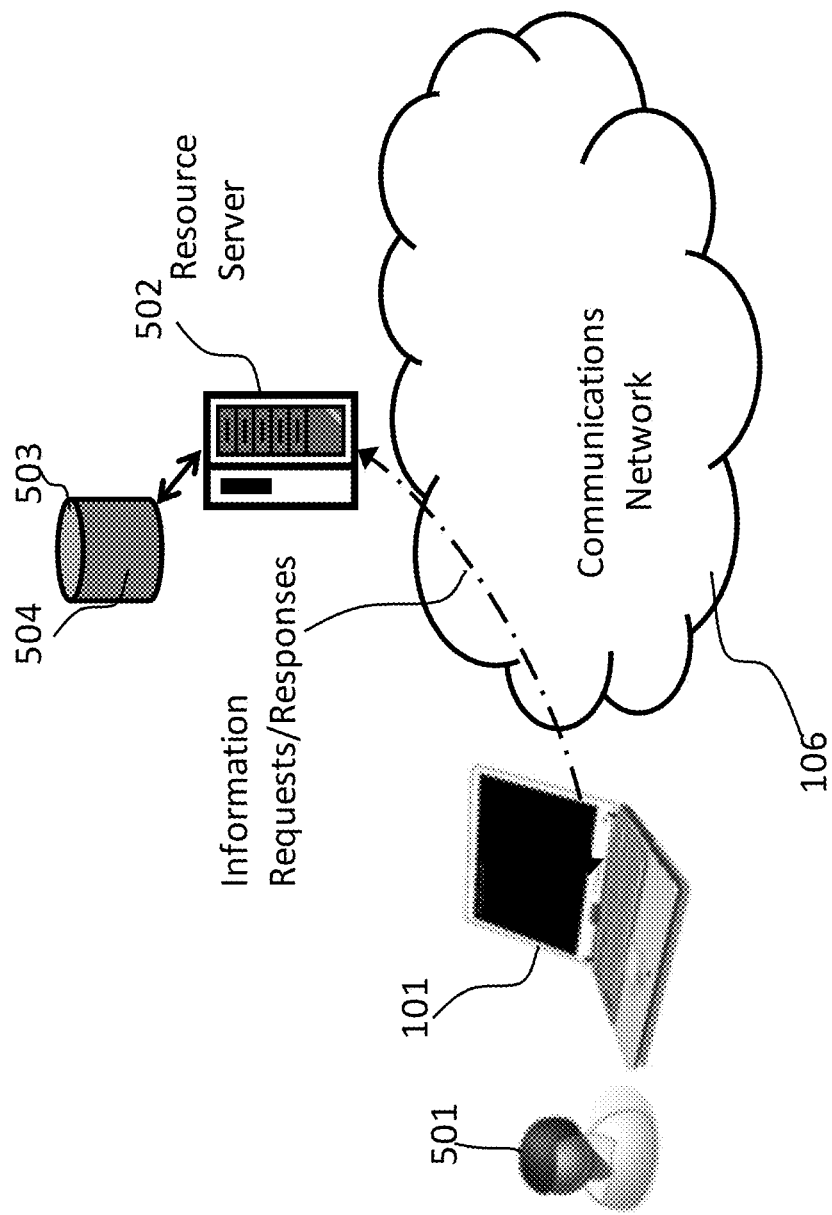
FIG. 5 shows the relationship between a user and a user computing device running user layer software and information resources retrieved from a resource server via a communications network, according to an embodiment of the invention.

FIG. 5 shows a preferred embodiment where a user's 501 computing device 101 is connected to a communications network 106 via which a user may cause the retrieval and display software 102 running on the device to make requests to information resource servers 502 which in turn accesses information storage devices 503 to access information resources 504 which are sent as a response to the computing device 101 over the communications network where they become retrieved information 108 for rendering by the retrieval and display software 102 on the user display 104 and for any processing by the user layer software 105.

Figure 6:
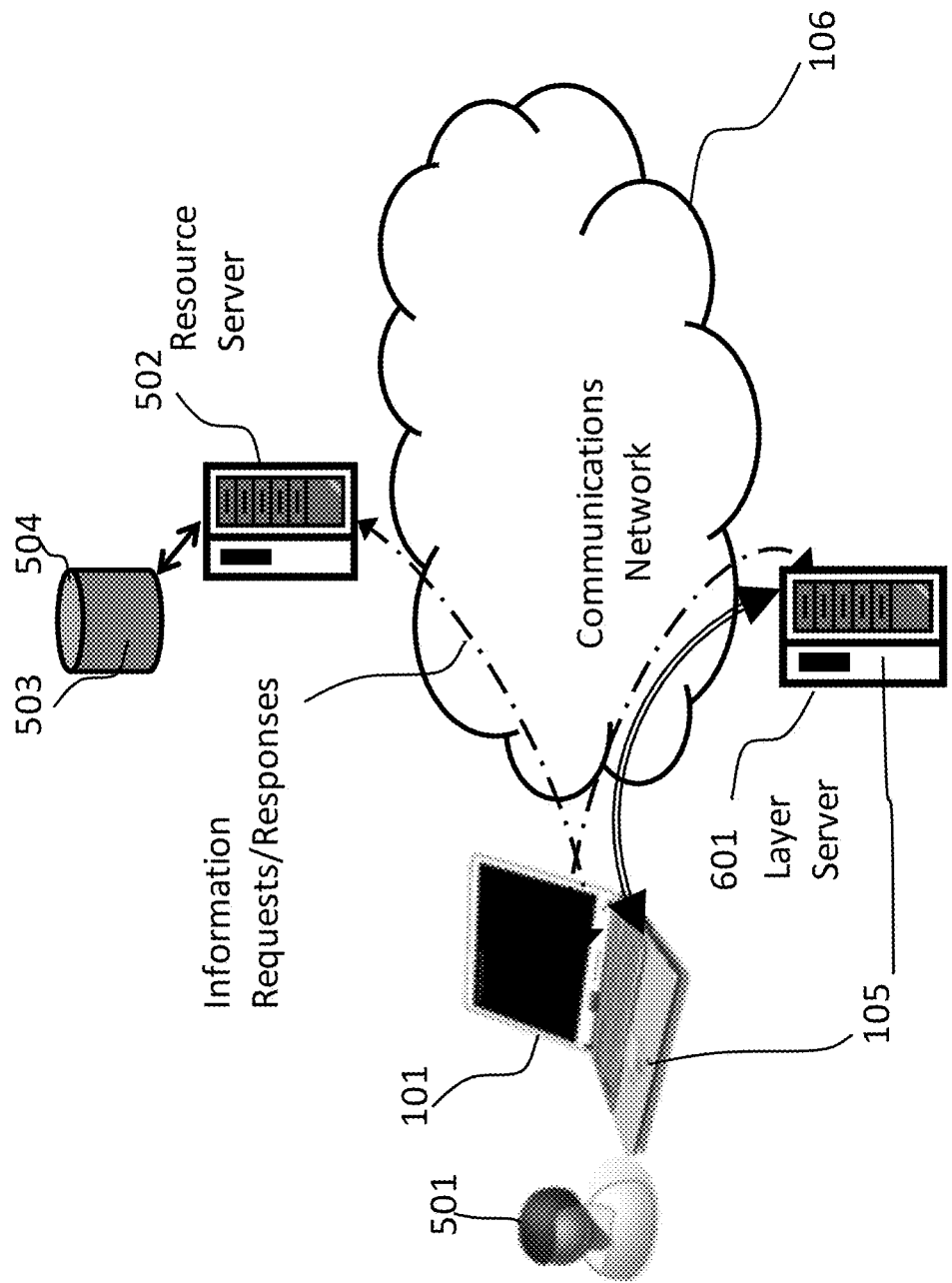
FIG. 6 is similar to FIG. 5 with the addition of a layer server attached to the communications network to store information related to user layers remotely from a user's computing device, according to an embodiment of the invention.

In the preferred embodiment, user layer configuration data 107 and user layer history 110 information may also be stored on a layer server 601 as illustrated in FIG. 6. A user 501 may thus access their user layer configuration data 107 and said histories thereof using any computing device 101 from which they are able to sign in to said layer server.

In a preferred embodiment as illustrated at FIG. 7, user layer software 105 provides a user 501 the ability to search and optionally edit one or more of user layer configuration data 107 and user layer history 110 data.

In a preferred embodiment, user layer software 105 allows for the naming of each set of user layer configuration data 107, illustrated in FIG. 7, for easy reference and for sets of user layer configuration data 107 to be grouped together to form a layer group and for each group to be named and activated together In the preferred embodiment, through layer precedence information stored within user layer configuration data 107 illustrated in FIG. 7, a user 501 may combine two or more sets of user layer configuration data 107 through cross-reference information that defines one or more connections between such sets of user layer configuration data 107 including the precedence of their processing and the condition activating said cross-reference; for example, one said set of user layer configuration data 107 may highlight duplicate items within the retrieved information 108, one said set may search for lowest price information for non-duplicate items by accessing additional retrieved information 108 and another said set may compare the results with prior results stored in the user layer history 110, all resulting a graphical overlay 303 annotating unique items with the current lowest price for each and prior lowest prices.

Figure 8:
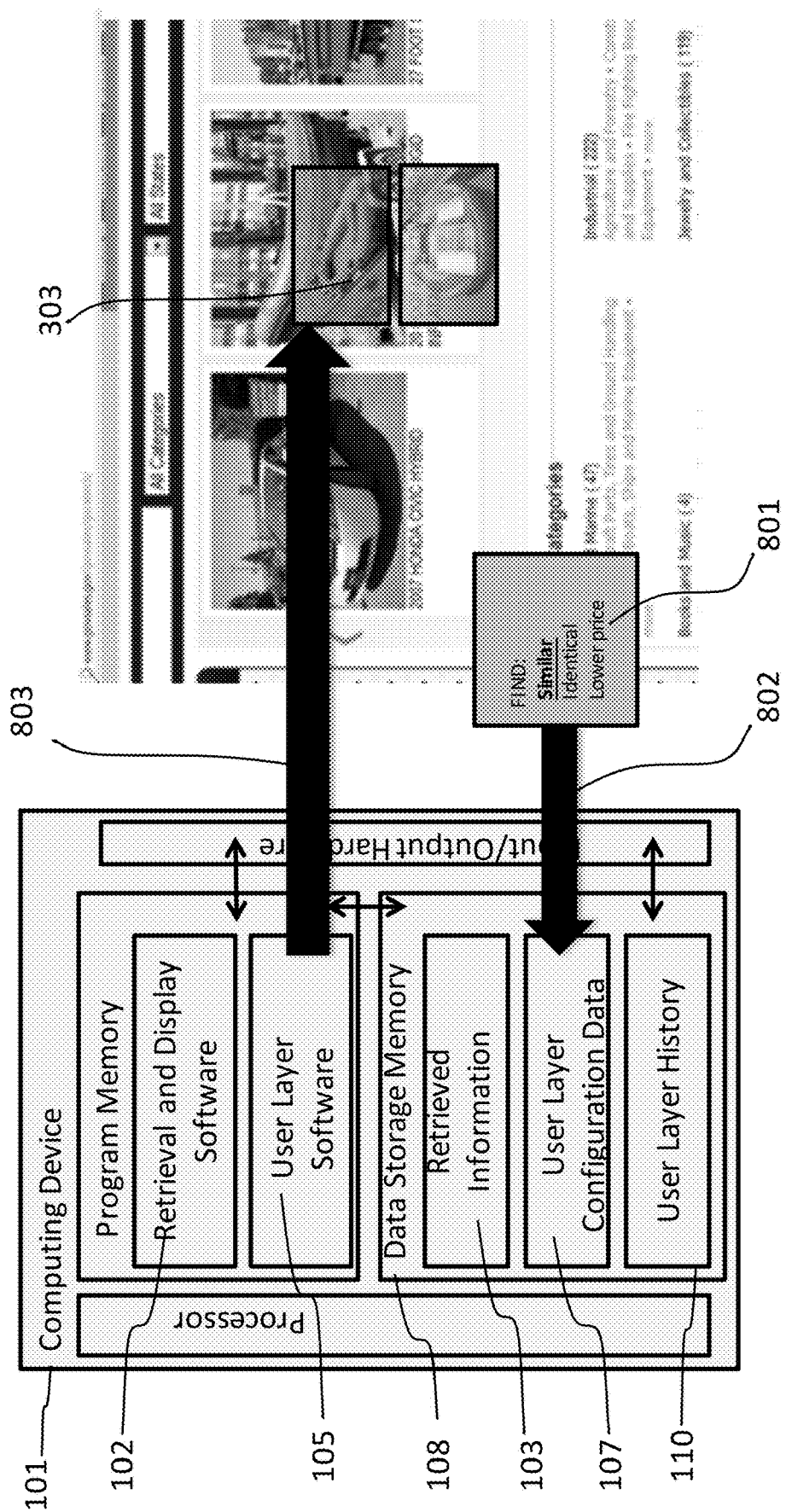
FIG. 8 is a schematic of the data flows in user layer configuration data being processed by user layer software to produce a graphic overlay, according to an embodiment of the invention.

In the preferred embodiment, a set of user layer configuration data 801 to be processed is loaded 802 into data storage memory 108 for user layer configuration data 107 in the user's computing device 101 where it is processed by user layer software 105 against retrieved information 103. A graphical overlay 303, if any results, is output 803 by user layer software 105 as part of a user layer display 302 in context with the rendered retrieved information 103. FIG. 8 provides a schematic representation of the above steps.

Figure 9:
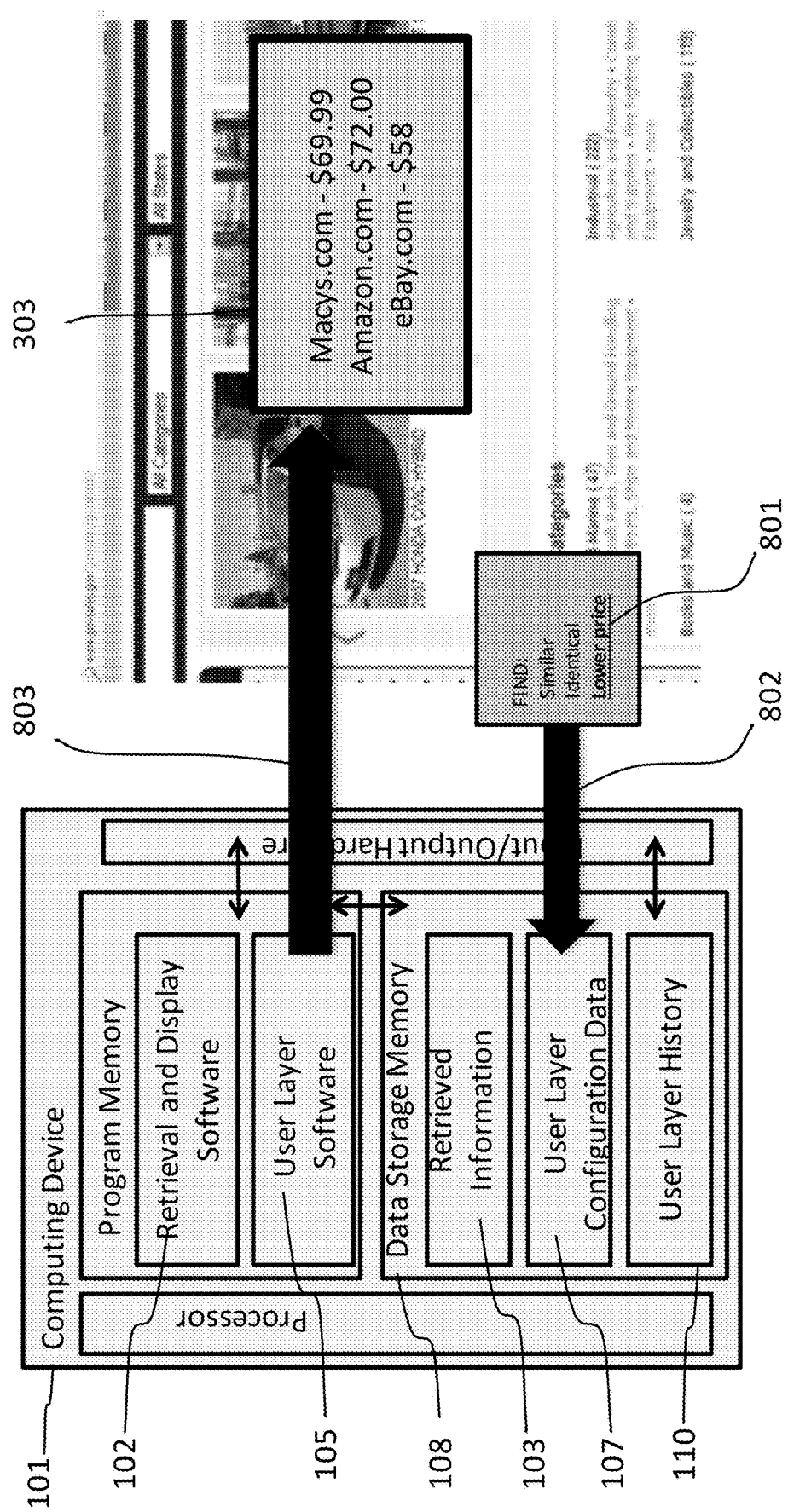
FIG. 9 exemplifies a result of processing a set of user layer configuration data that screens out items not meeting a criterion, according to an embodiment of the invention.

In the preferred embodiment, use layer software 105 stores a user layer history 110 that retains retrieved information 108 and results of its processing said retrieved information 108 according to user layer configuration data 107. An illustration of including user layer history 110 to produce a graphical overlay 303 is contained in FIG. 9, which is identical to FIG. 8 except that the user layer configuration data 107 has been edited to trigger a "Lower price" comparison rather than "Similar". For example, if a user is conducting a search of the Internet using retrieval and display software 102 and wishes to know which elements or group of elements in resulting retrieved information 108 were already returned by their prior searches, such conditions would be specified by the user as part of user layer configuration data 108 which user layer software 105 would process to detect such conditions and generate a graphical overlay 303 to assist the user in distinguishing new results from prior duplicates.

Figure 10:
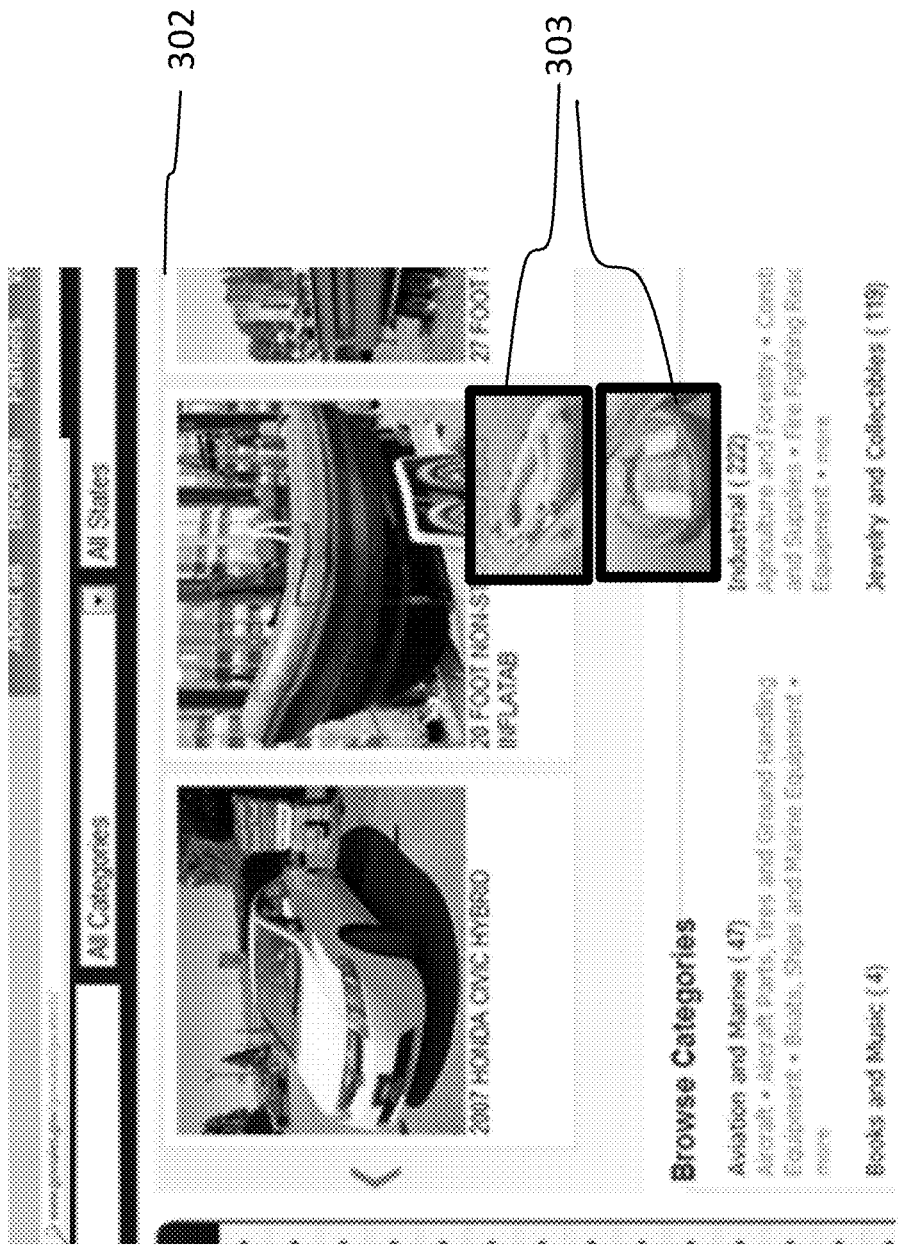
FIG. 10 illustrates examples of user layer display where the user layer software and user layer configuration data has resulted in notifications of objects also found on a set of reference sites defined in the user layer configuration data, according to an embodiment of the invention.

In a preferred embodiment, sets of user configuration layer data 107 are configurable by a user to automatically cause actions. For example, an automated process for finding matching data elements across a range of information resources 504 may be organized as follows: user layer configuration data 107 causes the user layer software 105 to first search a web page stored as retrieved information 108 for specific tagged elements by invoking the standard javascript function Element.getElementsByTagName( ) to return a list of all elements in said retrieved information 108 matching a tag name specified in user layer configuration data 107. Second, from the locations of other information resources 504 supplied as part if user layer configuration data 107, said user layer software 105 initiates retrieval and a search of said additional retrieved information 108 from said other information resources 504 to identify elements or groups of elements that match said tag name and generate a graphical overlay 303 highlighting elements for which matches were found and any ancillary information specified in the user layer configuration data 107 such as price and color. The result of such an operation is illustrated at FIG. 10, in which the screen shot shows a graphical overlay 303 annotating similar results from said other information resources 504 within a user layer display 302.

In the preferred embodiment, methods of annotation in graphical overlays 303 are specified in user layer configuration data 107 as illustrated at FIG. 7. By employing a variety of such methods, a user may define the color, style, positioning and other parameters of an annotation to distinguish between them and suit their preference either through public domain javascript methods such as window.alert ("annotation text"); to create a temporary pop-up window and rect(x, y, widthinpixels, heightinpixels); to draw a rectangle on top or proprietary or patented annotation methods. In this way, user configuration data 107 is used by user layer software 105 to display different distinguishing marks, style or modes of annotation in order to differentiate between results in a graphical overlay 303.

The preferred embodiment includes logic within the user layer software 105 to identify which subset of retrieved information 103 information has been visibly displayed within the display window 301 rendered by the retrieval and display software 102. The preferred embodiment accomplishes this by capturing a user's viewing position by means of positional parameters using one or more methods anticipated in claims 2 through 8 of patent application Ser. No. 13/938,122 filed Jul. 9, 2013 and storing said positional parameters as part of user layer history 110 data. User layer configuration data 107 may, therefore, additionally determine whether the user layer software 105 acts or acted on all retrieved information 108 or only retrieved information 108 that was visible to the user using viewing position information collected within user layer history data 110 as illustrated in FIG. 7.

Figure 11:
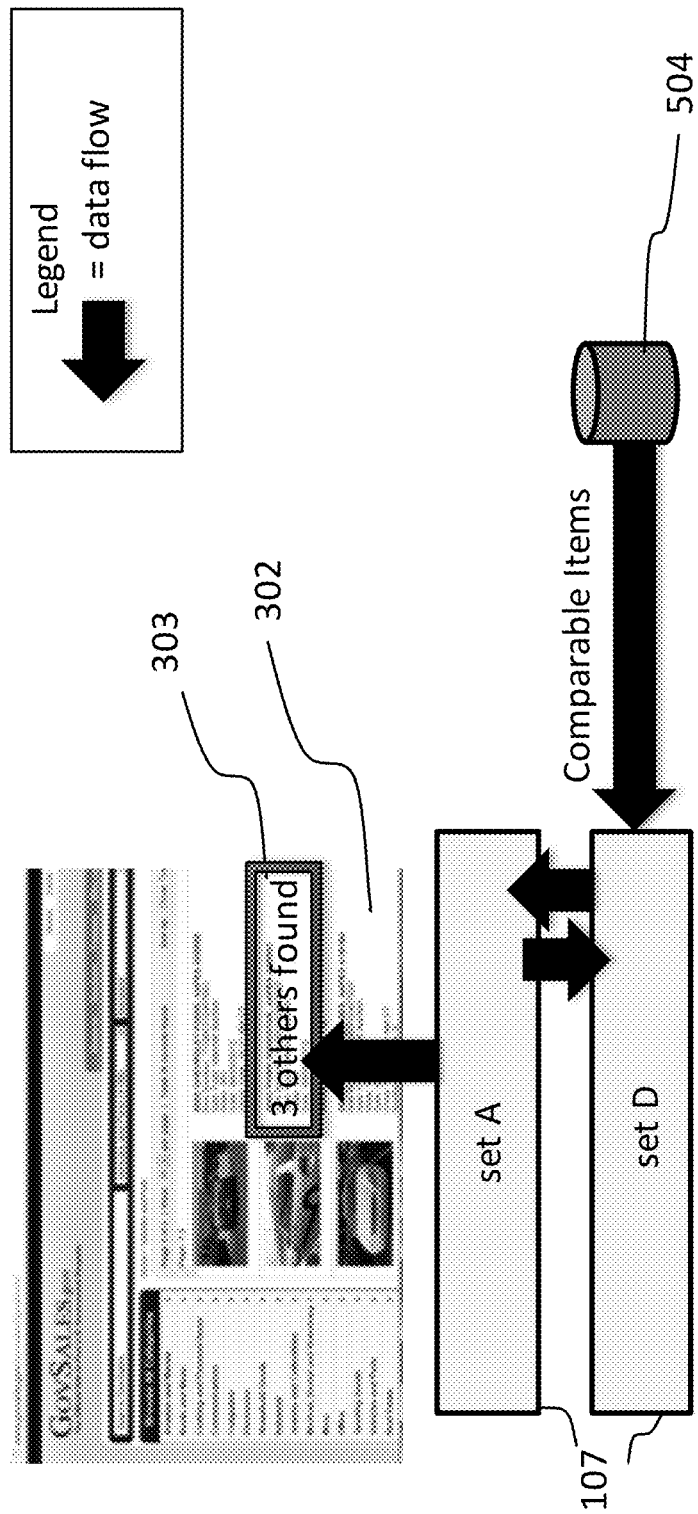
FIG. 11 illustrates an effect of configuring and combining two or more sets of user layer configuration data, according to an embodiment of the invention.
Figure 12:
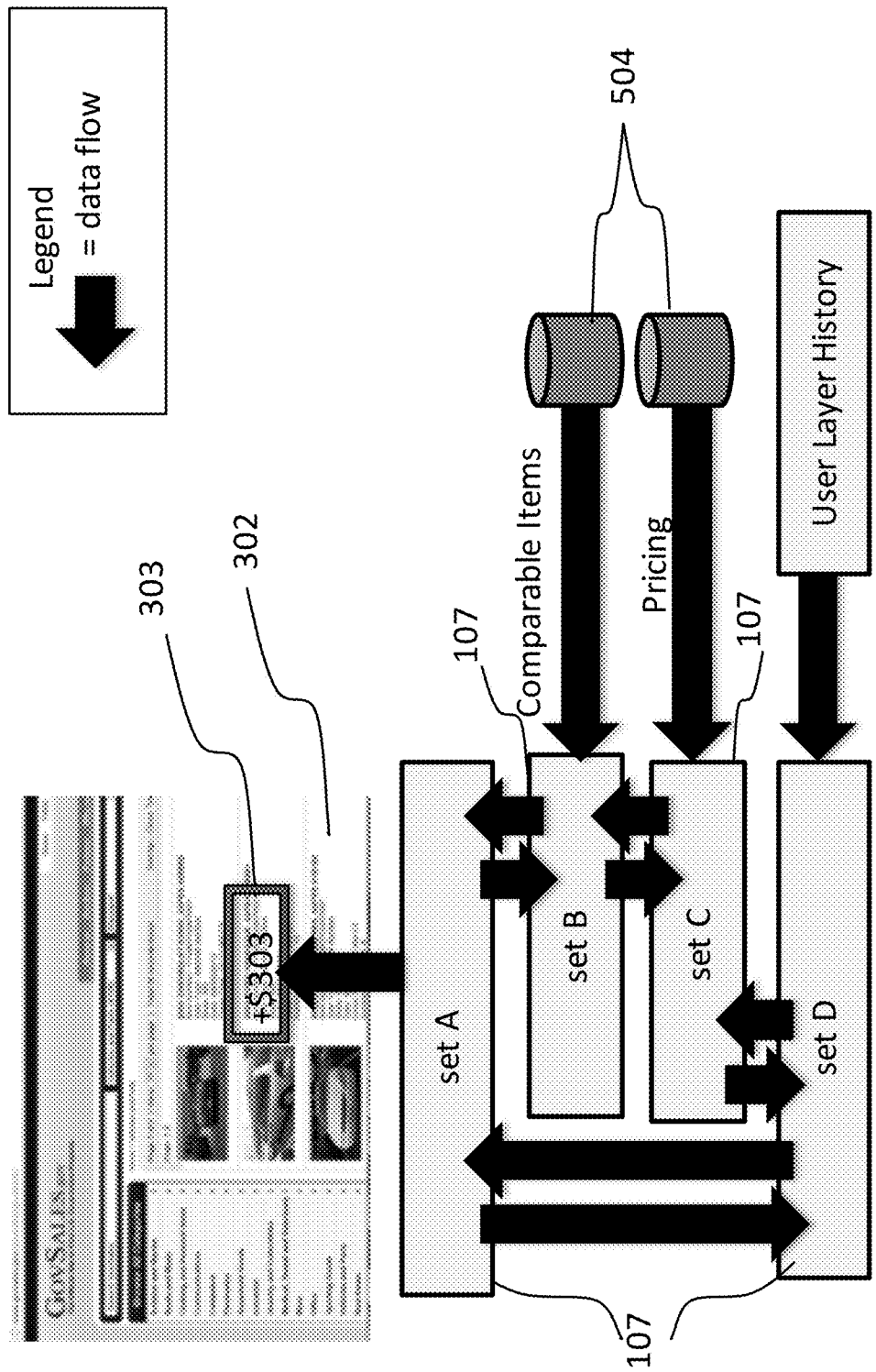
FIG. 12 is a schematic data flow diagram showing how multiple sets of user layer configuration data may interact with each other through the results from one layer being an input to one or more other layers.

The preferred embodiment of user layer software 105 may further assist the user 501 by allowing them to define how multiple sets of user layer configuration data 107 are applied to retrieved information 108. This embodiment allows a user 501 to specify, for example, sets of user layer configuration data 107 that should be applied on retrieved information 108 by user layer software 105 in series like successive filters, whether they are applied in parallel and whether iteration is applied. For example, by applying sets of user layer configuration data 107 in series user layer software 105 will produce a user display 104 annotating items that meet the conditions in all sets of user layer configuration data 107 whereas, by applying sets of user layer configuration data 107 in parallel, user layer software 105 will produce a user display 104 annotating items that meet the conditions defined within said sets of user layer configuration data 107 and when applying sets of user layer configuration data 107 iteratively, user layer software 105 will produce a user display 104 that is updated when underlying conditions change. This preferred embodiment of combining application of multiple sets of user configuration data 107 also solves for the user 501 problem of identifying similar but unique elements in a single graphical overlay 303 within a user layer display 302. A example of combining user layers to produce a graphical overlay 303 showing how many comparable items were found in a reference database is illustrated at the block diagram at FIG. 11 and an example block diagram of multiple user layers that together seek comparable items, seek pricing for them and displaying changes against historical results in a graphical overlay 303, is shown at FIG. 12.

Figure 13:
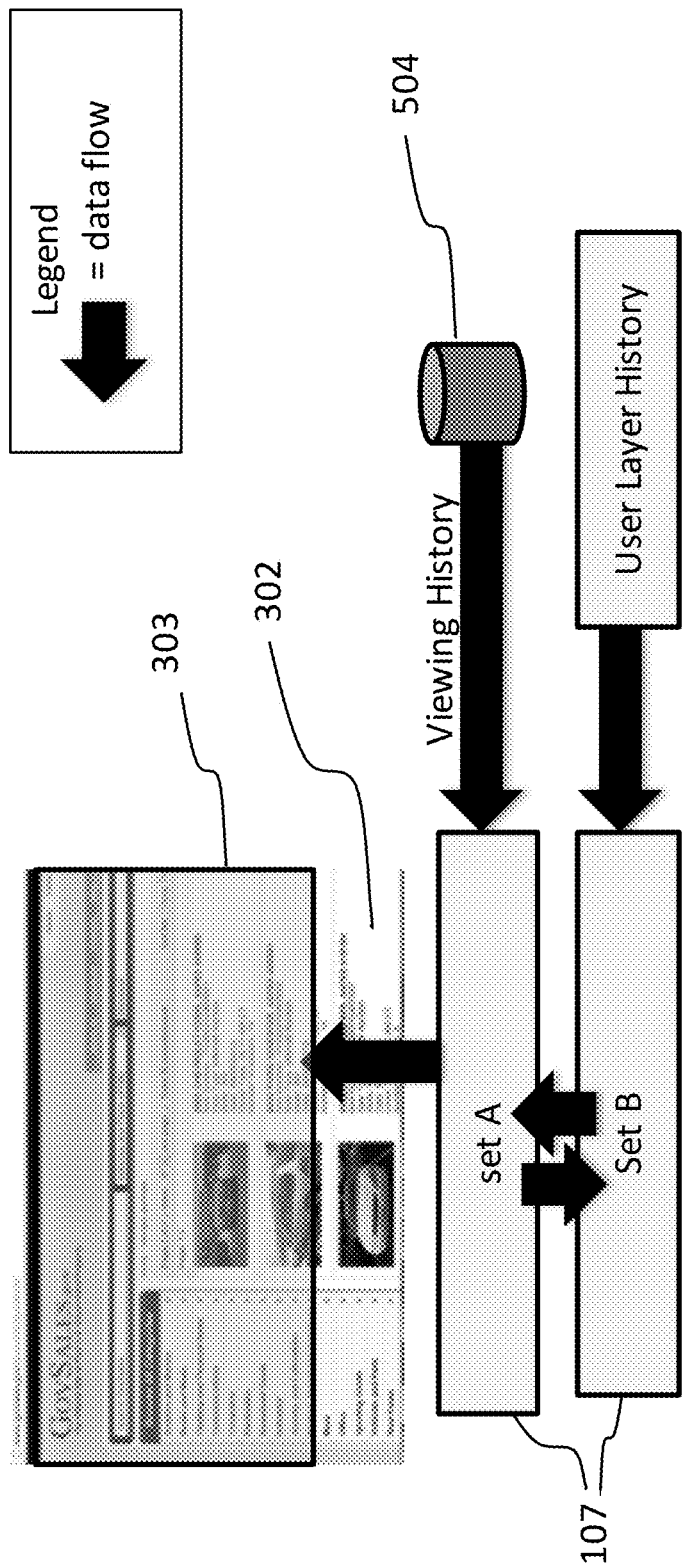
FIG. 13 illustrates the result of configuring the system to annotate resources that have previously been viewed in a user's display window.

In a preferred embodiment, user layer software has access to a user's viewing history as an information resource 504 and user layer history 101 from which is produced a graphical overlay 303 that annotates a portion or portions of previously retrieved information 108 already seen by the user in the manner exemplified in FIG. 13.

Figure 14:
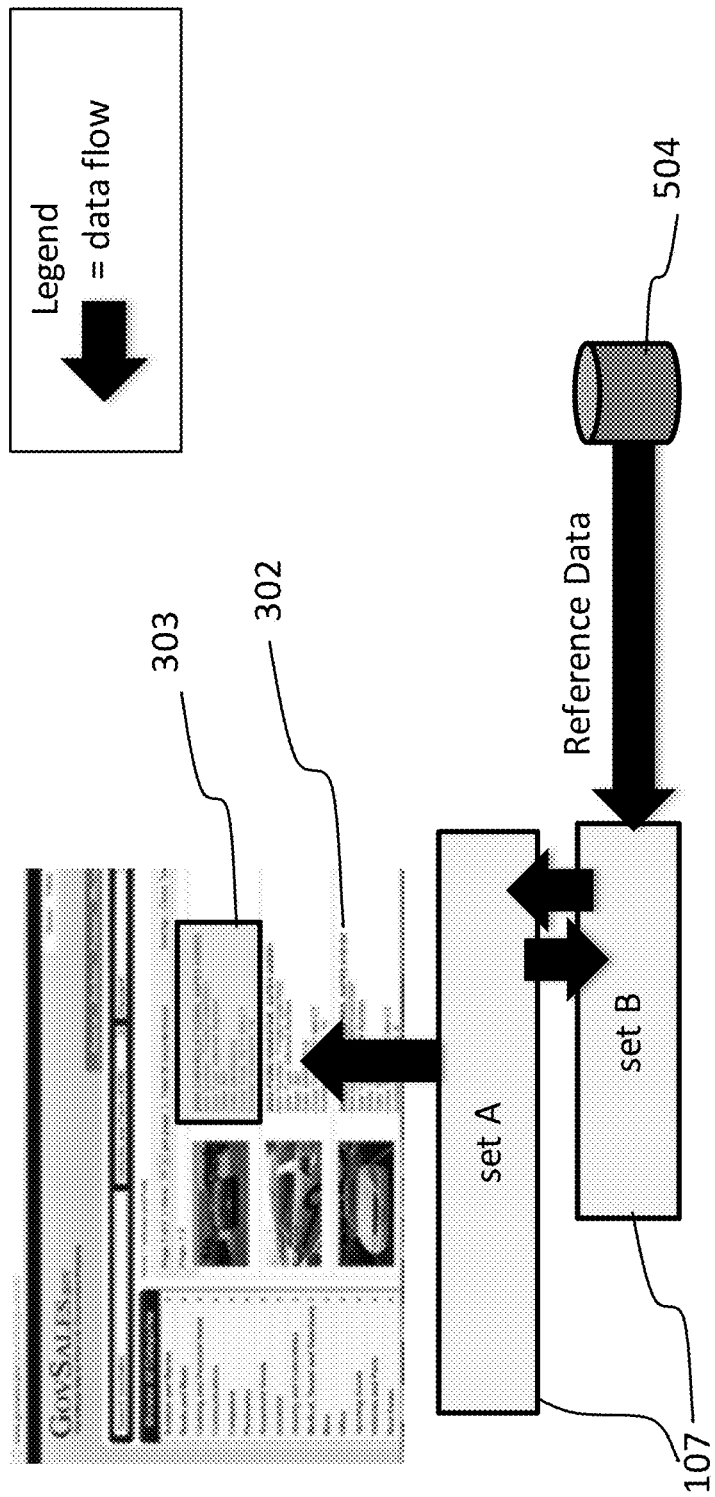
FIG. 14 illustrates the result of configuring the system to annotate text that appears in two sets of retrieved information.

In a preferred embodiment, user layer configuration data 107 is configurable by the a user to access one or more reference data sources as an information resource 504 such that elements within retrieved information 108 that also occur in said reference data are highlighted within a graphical overlay 303. Such a configuration is illustrated at FIG. 14.

In a preferred embodiment, user layer software 105 allows a user 501 to suppress a graphical overlay 303, thereby permitting them to see underlying rendered retrieved information 108 uncluttered by graphical overlay(s) 303.

The preferred embodiment of user layer software 105 assists users 501 in organizing their work by adding category meta-data, see example at FIG. 7, to user layer configuration data 107.

The preferred embodiment of user layer software 105 provides users 501 the ability to share at least one of user layer configuration data 107, graphical overlay 303, user layer display 302 and user layer history 110 with other users by stipulating so as illustrated in FIG. 7. Thus, an investment by one user in creating a user layer may be transferred for reuse to another user with the potential for monetary exchange in return for such transfer or reuse.

According to another embodiment of the invention, an apparatus for employing user layer software includes a display, an input/output hardware unit and a program memory coupled to a processor. Input/output hardware unit is capable of exchanging data with a network and data associated electronic resources accessible over a network. Program memory stores program instructions and a processor executes program instructions to (i) produce output from one or more software applications, (ii) execute user layer software for any user layer configuration data that has been enabled for those software applications, and (iii) display a graphical overlay derived from the output of user layer software placed in context with the output from said software applications in accordance with user layer configuration data.

According to another embodiment of the invention, a system for employing user layer software includes a database, an input/output hardware unit, and a program memory coupled to a processor. Input/output hardware unit is capable of exchanging data with a network. Program memory stores program instructions and the a processor is capable of executing program instructions to: (i) store and retrieve user layer configuration data from the database (ii) store and retrieve from the database results from the user layer software having been executed using user layer configuration data iii) initiate exchange with other users of user layer configuration data, iv) initiate exchange with another user of results from user layer software having been executed using their user layer configuration data.

According to another embodiment of the invention, a computer program product includes computer program logic stored in a tangible medium, wherein computer program logic executes program instructions to (i) execute user layer software for any user layer configuration data that has been enabled for a software application, and (iii) display a graphical overlay derived from the output of user layer software over the output from said software applications in accordance with user layer configuration data.

According to another embodiment of the invention, a computer program product includes computer program logic stored in a tangible medium, wherein computer program logic includes logic for causing a computer program to: (i) store and retrieve user layer configuration data from the database (ii) store and retrieve from the database the results from user layer software having been executed using user layer configuration data iii) initiate exchange with other users of user layer configuration data, iv) initiate exchange with another user of the results from user layer software having been executed using their user layer configuration data.

What is claimed is:

1. A method, executable by a processor, of processing sets of user layer configuration data retrieved by a user to produce a graphical overlay to retrieved information comprising:
   accessing retrieved information produced by a retrieval and display program from a plurality of electronic information resources accessible over a network and;
   accessing one or more sets of user layer configuration data;
   creating sets of user layer configuration data comprising one or more comparison test operations including parameters and instructions supplied by at least one user comprising one or more of keywords, strings of words or phrases, logic sequences, language expressions, paradigms, object recognition, target outcomes, third party tests and previously viewed electronic information resources with user's viewing position positional parameters of those previously viewed electronic information resources;
   retrieving from said sets of user layer configuration data selected by a user one or more comparison test operations executable by said processor on at least a portion of said retrieved information at said user's current viewing position;
   executing using said processor said comparison test operations specified in said user layer configuration data on the currently viewed portion of said retrieved information to at least determine what of retrieved information had been seen previously and generating annotation data comprising at least one comparison test result including said user's current viewing position positional parameters;
   displaying on a display a graphical overlay on at least a portion of said retrieved information at user's current viewing position, comprising at least one comparison test result on said graphical overlay such that a location of the at least one comparison test result conveys a directional distance ratio between the portion of the retrieved information on which the comparison test was performed and said user's current resource viewing position positional parameters and the viewing position positional parameters of said previously viewed electronic information resources used in the comparison test.

2. The method according to claim 1 wherein a user selects a portion of retrieved information comparison tests are carried out on.

3. The method according to claim 1, wherein a user layer display is shown in a display window on a user display as an overlay to retrieved information.

4. The method according to claim 1, wherein a user layer display is shown on a user display in a separate display window than retrieved information.

5. The method according to claim 1, further comprising a user instructing user layer logic to create, modify, activate and deactivate one or more sets of user layer configuration data.

6. The method according to claim 1, further comprising entry of user layer configuration data specifying actions that are taken autonomously by user layer logic as if directly carried out by said user.

7. The method according to claim 1, wherein logic specified within user layer configuration data further generates one or more sets of user layer history data by said processor applying user layer configuration data to retrieved information when previously retrieved to derive a user layer display that graphically shows said user layer history data in context with the a user's viewing position of currently retrieved information.

8. The method according to claim 1, wherein user layer logic applies retrieval rules defined within a set of user layer configuration data to one or more parts of retrieved information to automatically obtain additional retrieved information from one or more of a resource server.

9. The method according to claim 8 wherein at least a portion of one or more of said additional retrieved information and user layer history information is processed using rules contained in user layer configuration data.

10. The method according to claim 8 wherein one or more of additional retrieved information and user layer history information is processed by user layer logic according to comparison tests defined in user layer configuration data and the comparison test results are incorporated into one or more sets of other user layer configuration data instead of directly displaying results in a user layer display.

11. The method according to claim 1, further comprising user layer logic to store a user layer history for one or more sets of user layer configuration data allowing retrieval and display of user layer configuration data and edits thereto, retrieved information, user layer configuration data applied and results of processing by the a user layer logic.

12. The method according to claim 10, further comprising at least one of users' viewing positions for additional retrieved information and adding that context to said graphical overlay.

13. The method according to claim 10, further comprising a user instructing user layer logic to search one or more of user layer configuration data and user layer histories and to display one or more search results.

14. The method according to claim 1, further comprising a user instructing user layer logic to share sets of user layer configuration data between one or more other users.

15. The method according to claim 1, further comprising a user instructing user layer logic to share output from processing user layer configuration data between users in context with said retrieved information.

16. The method according to claim 1, further comprising a user instructing user layer logic to segregate outputs from processing of user layer configuration data into separate user-defined episodes grouped under topic headings.

17. An apparatus for retrieving electronic information resources and retrieving user layer configuration data comprising comparison tests, applying said tests and displaying the results of said tests to produce a graphical overlay shown in context with said retrieved electronic information, comprising:
  a display;
  an input/output hardware unit configured to access data over a network such that retrieved information is displayable by a retrieval and display program;
  a program memory storing program instructions; and
  a processor, coupled to the memory, the display and the input/output hardware unit, configured to execute program instructions for
  accessing retrieved information produced by a retrieval and display program from a plurality of electronic information resources accessible over a network and;
  accessing one or more sets of user layer configuration data;
  creating sets of user layer configuration data comprising one or more comparison test operations including parameters and instructions supplied by at least one user comprising one or more of keywords, strings of words or phrases, logic sequences, language expressions, paradigms, object recognition, target outcomes, third party tests and previously viewed electronic information resources with user's viewing position positional parameters of those previously viewed electronic information resources;
  retrieving from said sets of user layer configuration data selected by a user one or more comparison test operations executable by said processor on at least a portion of said retrieved information at said user's current viewing position;
  executing using said processor said comparison test operations specified in said user layer configuration data on the currently viewed portion of said retrieved information to at least determine what of retrieved information had been seen previously and generating annotation data comprising at least one comparison test result including said user's current viewing position positional parameters;
  displaying on a display a graphical overlay on at least a portion of said retrieved information at user's current viewing position, comprising at least one comparison test result on said graphical overlay such that a location of the at least one comparison test result conveys a directional distance ratio between the portion of the retrieved information on which the comparison test was performed and said user's current resource viewing position positional parameters and the viewing position positional parameters of said previously viewed electronic information resources used in the comparison test.

18. A system for retrieving user layer configuration data and further retrieving current and historic user layer data and processing said current and historic user layer data in accordance with rules contained in said user layer configuration data to produce graphical overlays, comprising:
  a database;
  an input/output hardware unit configured to exchange data with a network;
  a program memory for storing program instructions;
  a processor coupled with a database, the input/output hardware unit and the memory configured to execute the program instructions for
  accessing retrieved information produced by a retrieval and display program from a plurality of electronic information resources accessible over a network and;
  accessing one or more sets of user layer configuration data;
  creating sets of user layer configuration data comprising one or more comparison test operations including parameters and instructions supplied by at least one user comprising one or more of keywords, strings of words or phrases, logic sequences, language expressions, paradigms, object recognition, target outcomes, third party tests and previously viewed electronic information resources with user's viewing position positional parameters of those previously viewed electronic information resources;
  retrieving from said sets of user layer configuration data selected by a user one or more comparison test operations executable by said processor on at least a portion of said retrieved information at said user's current viewing position;

executing using said processor said comparison test operations specified in said user layer configuration data on the currently viewed portion of said retrieved information to at least determine what of retrieved information had been seen previously and generating annotation data comprising at least one comparison test result including said user's current viewing position positional parameters;

displaying on a display a graphical overlay on at least a portion of said retrieved information at user's current viewing position, comprising at least one comparison test result on said graphical overlay such that a location of the at least one comparison test result conveys a directional distance ratio between the portion of the retrieved information on which the comparison test was performed and said user's current resource viewing position positional parameters and the viewing position positional parameters of said previously viewed electronic information resources used in the comparison test.

19. A computer program product for retrieving electronic information resources and retrieving user layer configuration data comprising comparison tests, applying said tests and displaying the results of said tests to produce a graphical overlay shown in context with said retrieved electronic information including computer program logic stored in a non-transitory computer-readable storage medium, for:

accessing retrieved information produced by a retrieval and display program from a plurality of electronic information resources accessible over a network and;

accessing one or more sets of user layer configuration data;

creating sets of user layer configuration data comprising one or more comparison test operations including parameters and instructions supplied by at least one user comprising one or more of keywords, strings of words or phrases, logic sequences, language expressions, paradigms, object recognition, target outcomes, third party tests and previously viewed electronic information resources with user's viewing position positional parameters of those previously viewed electronic information resources;

retrieving from said sets of user layer configuration data selected by a user one or more comparison test operations executable by said processor on at least a portion of said retrieved information at said user's current viewing position;

executing using said processor said comparison test operations specified in said user layer configuration data on the currently viewed portion of said retrieved information to at least determine what of retrieved information had been seen previously and generating annotation data comprising at least one comparison test result including said user's current viewing position positional parameters;

displaying on a display a graphical overlay on at least a portion of said retrieved information at user's current viewing position, comprising at least one comparison test result on said graphical overlay such that a location of the at least one comparison test result conveys a directional distance ratio between the portion of the retrieved information on which the comparison test was performed and said user's current resource viewing position positional parameters and the viewing position positional parameters of said previously viewed electronic information resources used in the comparison test.

20. A computer program product for retrieving user layer configuration data and further retrieving current and historic user layer data and processing said current and historic user layer data in accordance with rules contained in said user layer configuration data to produce graphical overlays, including computer program logic stored in a non-transitory computer-readable storage medium, comprising:

accessing retrieved information produced by a retrieval and display program from a plurality of electronic information resources accessible over a network and;

accessing one or more sets of user layer configuration data;

creating sets of user layer configuration data comprising one or more comparison test operations including parameters and instructions supplied by at least one user comprising one or more of keywords, strings of words or phrases, logic sequences, language expressions, paradigms, object recognition, target outcomes, third party tests and previously viewed electronic information resources with user's viewing position positional parameters of those previously viewed electronic information resources;

retrieving from said sets of user layer configuration data selected by a user one or more comparison test operations executable by said processor on at least a portion of said retrieved information at said user's current viewing position;

executing using said processor said comparison test operations specified in said user layer configuration data on the currently viewed portion of said retrieved information to at least determine what of retrieved information had been seen previously and generating annotation data comprising at least one comparison test result including said user's current viewing position positional parameters;

displaying on a display a graphical overlay on at least a portion of said retrieved information at user's current viewing position, comprising at least one comparison test result on said graphical overlay such that a location of the at least one comparison test result conveys a directional distance ratio between the portion of the retrieved information on which the comparison test was performed and said user's current resource viewing position positional parameters and the viewing position positional parameters of said previously viewed electronic information resources used in the comparison test.

* * * * *